Oct. 6, 1970  T. M. JULOW  3,532,395
HYDRAULIC CONTROL VALVE

Filed June 20, 1968  2 Sheets-Sheet 1

INVENTOR.
THOMAS M. JULOW
BY
Richard G. Geib
ATTORNEY

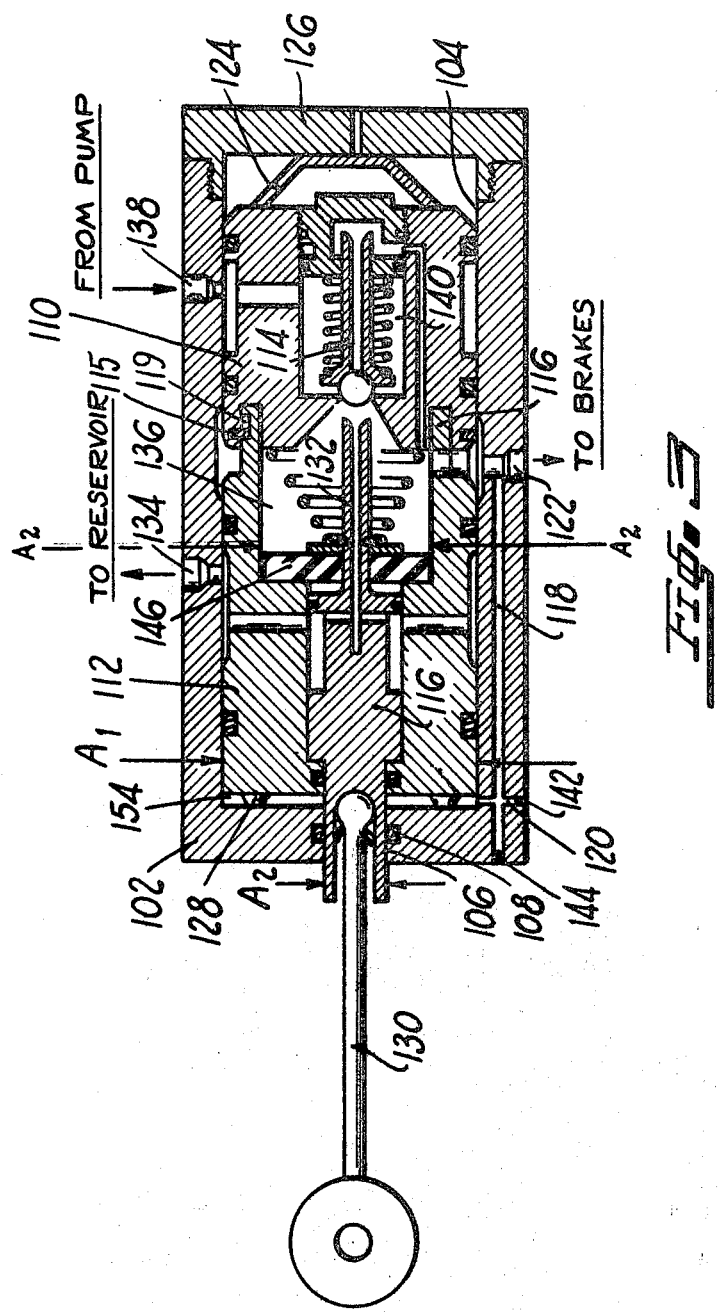

United States Patent Office
3,532,395
Patented Oct. 6, 1970

3,532,395
HYDRAULIC CONTROL VALVE
Thomas M. Julow, South Bend, Ind., assignor to The Bendix Corporation, a corporation of Delaware
Filed June 20, 1968, Ser. No. 738,643
Int. Cl. B60t 13/14, 15/36
U.S. Cl. 303—54    9 Claims

ABSTRACT OF THE DISCLOSURE

A hydraulic pressure control device having a three-way valve poppet and operating element incorporating a pressure responsive feel feature which is improved by means to render the valve travel variable up to a predetermined control pressure.

SUMMARY

In hydraulic pressure control valves within the knowledge of those skilled in the art the manner of providing feel for controllability has been to utilize hydraulic pressure on a proportioned area. When taking these valves and applying them to vehicle brake systems it has been felt that this is a sufficient manner to permit the vehicle operator to control the braking.

There are, however, some problems of environment which have not altogether been taken into account in such installations. This can be generally surmised in that the vehicle operator's leg motions and/or foot pressures in operating the vehicle brake system must be considered.

Over the years the vehicle operator has become accustomed to a travel sensation in operating the vehicle brakes. A hydraulic pressure control valve of prior art designs by its very nature of porting high hydraulic pressure has limited travel required for valve operation. According to a feature of this invention the travel sensation needed in the utilization of this type of control for vehicle brakes and/or other uses with similar operator transition problems is provided by rendering the control valve opening position variable up to a predetermined control pressure, after which it is fixed.

A more detailed description of the inventive features of this invention is the provisioning of a valve body, housing a poppet valve for controlling the supply of hydraulic pressure to a control chamber, with means to render the position of the poppet valve variable in accordance with hydraulic pressure in the control chamber up to a predetermined control chamber pressure.

A still further detailed object of this invention is to utilize a pressure responsive valve means normally positioned by spring means within a housing to vary the travel required to open the valve poppet of the valve means up to a predetermined control pressure.

DRAWING DESCRIPTION

FIG. 3 is a cross sectioned side view of another form of control valve with the principles of this invention employed therein in a modified form as respects FIG. 1.

DETAILED DESCRIPTION

Figure 1:
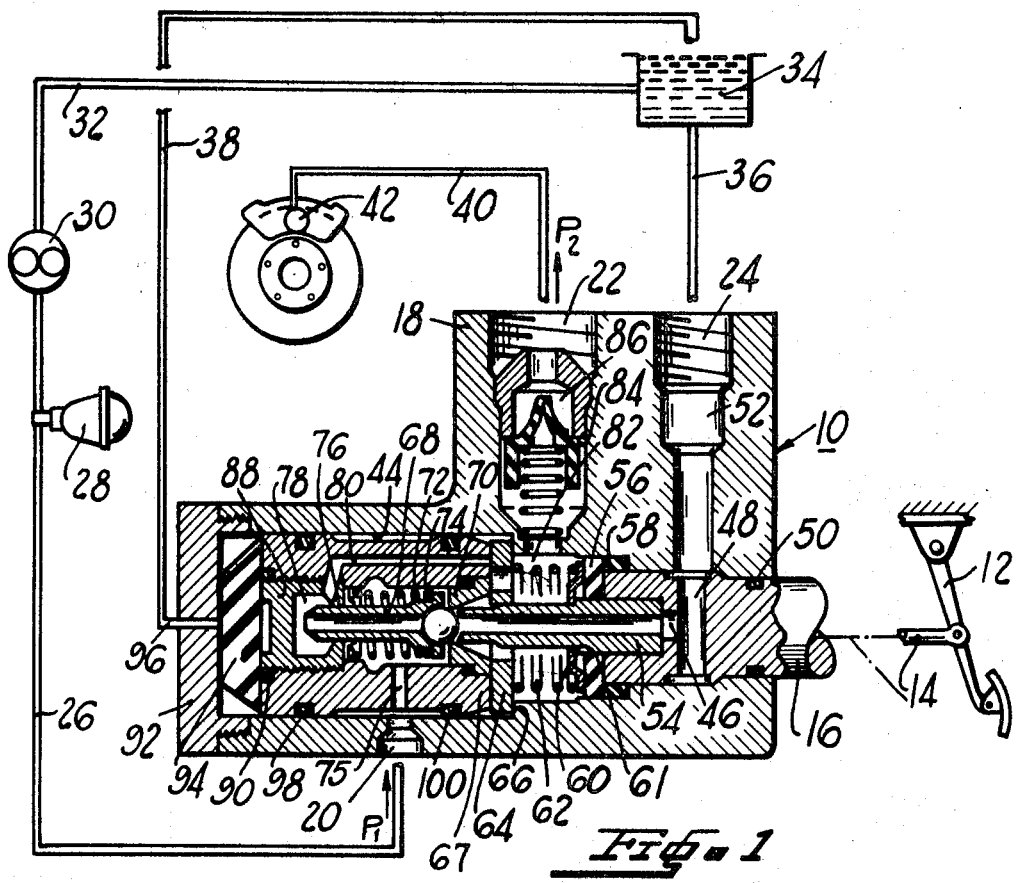
FIG. 1 is a schematic illustration of a hydraulic power brake system with a control valve according to the principles of this invention shown in cross section.

With more particular reference now to FIG. 1 there is shown a hydraulic control valve 10 which is adapted to be actuated by a brake pedal 12, of an automobile or the like in that it is linked thereto by a rod 14 which is affixed to, or formed as an integral part of, a valve control element or plunger 16 of the control valve 10. As seen, the control valve is provided with a housing 18 having a hydraulic pressure inlet port 20, a control pressure discharge port 22 and a hydraulic return port 24. The valve 10 is inserted in a hydraulic system to be connected by a conduit 26 to an accumulator 28 storing pressure from a pump 30. The pump 30, as will be recognized by those skilled in the art, is a simple gear pump which may incorporate fluid by-pass provisions whenever the predetermined charge for the accumulator 28 is reached. The pump receives it fluid supply via a conduit 32 from a fluid reservoir 34, which is also connected by a conduit 36 to the return port 24. In addition a conduit 38 is affixed to the housing 18 and opened to the top of the reservoir 34 to return leaking fluid from the housing 18, as will be more further described hereinafter. The hydraulic pressure discharge port 22 ports the discharge port 22 ports the discharge pressure "$P_2$" via a conduit 40 connected therewith to a brake cylinder such as the disc brake cylinder 42 schematically illustrated in this FIG. 1.

The housing 18 may be formed as a casting with a longitudinal stepped bore 44. Bore 44 has its largest opening adapted for the assembly of the valve parts inclusive of the valve operating element 16 from the large end. In other words, the valve element 16 having drilled passages 46 and 48 and O-ring 50 is inserted from the large end of the housing bore 18 so that the passage 48 communicates with a cross drilled passage 52 terminating in the return fluid port 25 aforementioned.

Prior to the assembly, a hollow valve stem 54 is fitted within the passage 46 to project to the left of the element 16 within the housing. An annular, rubber disc 56 is fitted over the hollow stem 54 to rest on the forward face of the valve element 16 and against a shoulder 58 of the housing 18 in the stepped bore 44.

A spring retainer 60 is then placed against a shoulder 61 of the stem 54 and a spring 62 is laid thereover within the stepped bore 44. Spacer ring 64 is then placed within the stepped bore 44 to, upon assembly, abut on shoulder 66 of the bore 44. Next, a valve body of piston 67 is inserted in the bore 44. This body comprises a valve poppet assembly 68 and a valve seat 70 with a valve spring 72 biasing the poppet assembly 68 to abut the valve seat 70 and close an inlet pressure chamber 74 within the body 67. This inlet chamber is communicated by passage 75 in the body 67 to the port 20. The valve poppet assembly 68 is supported in the valve body 67 about a sealed opening 76 on the end opposite the opening in which the valve seat 70 is assembled. This opening 76 leads to a valve balancing chamber 78 communicated by a passage 80 to control chamber 82 between the valve operating element 16 and the valve body 67. The control chamber 82 is communicated by a cross drilled passage 84 to the discharge port 22. With reference to FIG. 1 there is shown in the discharge port 22 a residual pressure valve assembly 86 which may be employed in the braking system in accordance with the vehicle manufacturer's specifications. Normally in a disc brake system such as is shown, the residual pressure valve 86 is not considered a required item.

In any event the valve balancing chamber 78 is closed by a plug 88 threaded to the valve body 67, which assembly is sealed by means of an O-ring 90 carried by the valve body.

This preassembled valve means is then inserted within the stepped bore to abut the ring 64 onto the shoulder 66. This abutment is brought about by the threading of plug 92 to the housing 18 with a deformable rubber disc 94 interposed to place a spring load to the right on the valve body 67. The plug 92 is provided with an opening 96 to which a conduit 38 is connected to provide a leakage path for hydraulic fluid that has seeped by the O-ring seal 98 of the valve body 67. It should be noted that this O-ring seal 98 cooperates with another O-ring seal 100 to seal the inlet pressure chamber 74 from the control chamber 82 as well as the vented chamber to the left of the body 67, within which the rubber disc 94, in the shape of a cone, is operative to position body 67.

Figure 2:
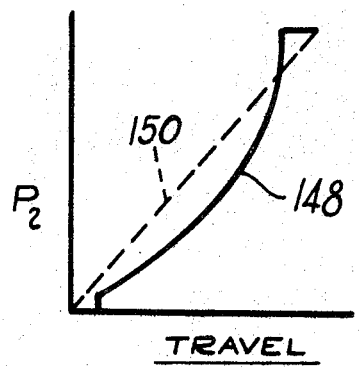
FIG. 2 is a graphical illustration of the pedal travel brake pressure relationship obtainable with this invention as compared to prior art structures without this invention.

Passing by, for the moment, any description with regard to the graphical illustration of FIG. 2, which will be referred to in the operation section of this specification, the reader's attention is directed to FIG. 3 showing a modified control valve which may be adapted to the schematic brake system of FIG. 1. In this instance a valve housing 102 is provided with a straight bore within which a valve means is operatively assembled. The straight bore 104 is opened at the left end of the housing as at 106 and a seal 108 is assembled within a groove just inside the face of this opening 106. The valve means is essentially a complete subassembly comprising a two part valve body or piston having one part 110 and another part 112 carrying, respectively, valve poppet assembly 114 and valve control element or plunger 116. The valve housing is provided with drilled passages 118 and 120 which communicates hydraulic pressure discharge port 122 to a chamber 154 to the left of the part 112 of the valve body assembly between it and the housing. The part 110 and the part 112 are assembled so that they may be movable relatively to one another by means of a snap ring 115 which is fitted from the exterior of the part 110 into a slot 119 of a projecting annulus 116 of the part 112. Slot 119 is extended so as to permit the part 110 to move to the right with respect to the part 112.

A Belleville spring 124, or wave washer, depending upon which is desired, is inserted in the bore onto the valve means within the housing 102 over the part 110. A plug 126 is then threaded to the housing 102 to position the valve means so that the stops 128 bear on the left end of the bore 104 maintaining the space for chamber 154 between it and the part 112 of the valve means assembly. The valve operating member 116 has a shank portion of an area "$A_2$" which projects exteriorly of the housing 102 so that the effective area of chamber 124 is $A_1$, the area of the valve means within the bore 104, minus the area $A_2$.

OPERATION

With reference to the structure of FIG. 3, when the operator of the vehicle depresses the brake pedal to move rod 130 to the right, the valve poppet assembly 114 first laps off the communication via hollow plunger 132 to return port 134 of control chamber 136. Further movement displaces the poppet valve assembly to communicate inlet port pressure from the inlet port 138 to valve chamber 140 within part 110 to the control chamber 136 and thence to the hydraulic discharge port 122 to the vehicle brakes. At the same time this control pressure chamber is being directed via passages 118 and 120, which are closed by press fitted balls 142 and 144, after being drilled, to the chamber 154 to be effective on the area of the part equivalent to $A_1$–$A_2$. Thus, the control pressure within the control chamber 136 acting on the reaction disc 146 is partially balanced to provide a proportional pressure feel in the control element 116 and via link 130 to the brake pedal. At the same time this pressure within the control chamber 136 is acting on the entire area of the part 110 to begin deflection of the wave washer 124 or Belleville spring, as may be desired. As the deflection occurs, the poppet valve assembly 114 returns to its lapped condition unless the brake pedal is caused to travel a further distance.

This is similar to the operation of the valve 10 of FIG. 1 wherein the vehicle operator will depress the brake pedal 12 to move the valve control element 16 inwardly of the bore 44 to lap the hollow plunger 54 on the ball of the poppet assembly 68 closing off communication of the disc brake motors 42 to the return port 24 and the reservoir 34. Further depression of the brake pedal 12 will displace the poppet assemly 68 from the valve seat 70 to port the inlet pressure chamber 74 to the control chamber 82 and thence to the brake motors 42. This control pressure will be reactive on the disc 56 and will cause the disc 56 to bear on the shoulder 58 and extrude onto the face of the valve element 16 to provide the operator with a pressure reaction proportional to the braking pressure at the disc brakes. At the same time the pressure in the control chamber 82 will be reactive on the right face of the valve body 67 to compress the rubber disc 94 whereby the valve body 67 will be moved to the left within the bore 44 until the disc 94 can be no longer compressed. This could be in the pressure cycle before, near or at a position of run-out pressure for the disc brakes of the vehicle.

Thus, until deformation of springs 94 or 124 ceases, the brake pedal 12 will not only have a pressure reaction sensation but will have a travel sensation imparted thereto.

This is more clearly illustrated by FIG. 2 showing the graphical relationship 148 for the valves of FIGS. 1 and 3 in a solid line. The prior art structures have been observed to have followed the straight line functions shown by the dash line 150 in FIG. 2.

I claim:
1. In a hydraulic control valve:
   a housing having an inlet port, and outlet port, a return port, and a bore communicating the inlet port with the outlet port;
   passage means in said housing communicating said return port with said outlet port;
   a piston slidably mounted in said bore;
   valve means for controlling fluid communication between the inlet port and the outlet port;
   said valve means being mounted in said piston for movement therewith; and
   a manually movable plunger slidable in said housing;
   said plunger initially terminating fluid communication between said outlet port and said return port upon sliding of the plunger and thereafter opening said valve means to initiate fluid communication between the inlet port and the outlet port through said bore;
   the fluid pressure in said bore sliding said piston therein, when said valve means is opened, said plunger following said piston to thereby provide a feeling of movement to the valve operator.
2. The invention of claim 1; and
   resilient means mounted between said piston and the end of the bore to resist said sliding of the piston.
3. The invention of claim 2:
   said plunger and said piston being generally colinear and defining a fluid control chamber therebetween;
   said outlet port being in fluid communication with said control chamber;
   the fluid in said control chamber acting against the end of said plunger to thereby provide a reactive force through the plunger to the valve operator which is proportional to the fluid pressure level in said chamber.
4. The invention of claim 3:
   said passage means being formed in said plunger and being closed by said valve means upon engagement of the latter by said plunger before said valve means is opened.
5. The invention of claim 1:
   said plunger being slidably mounted in said piston; and
   a fluid control chamber in said housing, said valve communicating the inlet port with the control chamber upon opening of the valve means, said outlet port being in fluid communication with said control chamber;
   the fluid in said control chamber acting against the end of said plunger to thereby provide a reactive force through the plunger to the valve operator which is proportional to the fluid pressure level in said chamber.

6. The invention of claim 5:
first and second compartments in said bore defined by opposite ends of the piston and corresponding ends of the bore; and
resilient means mounted in one of said compartments to resist said sliding of the piston.

7. The invention of claim 6; and
means communicating fluid from said control chamber to the other compartment to force the piston toward said one compartment;
said piston carrying said plunger toward said one compartment to provide said feeling of movement to the valve operator.

8. The invention of claim 7:
said passage means being formed in said plunger and being closed by said valve means upon engagement of the latter by said plunger before said valve means is opened.

9. The invention of claim 7:
said piston having first and second portions;
said plunger being carrier by one of said portions;
said valve means being carried by the other portion;
said control chamber being defined by adjacent ends of said first and second portions; and
means coupling said first portion to said second portion which permits limited relative movement therebetween.

References Cited

UNITED STATES PATENTS

| | | | |
|---|---|---|---|
| 3,003,825 | 10/1961 | Remble | 303—54 |
| 3,031,235 | 4/1962 | Schwartz | 303—54 |
| 3,050,344 | 8/1962 | Kershner | 303—54 |
| 3,317,252 | 5/1967 | Gassman | 303—54 |

MILTON BUCHLER, Primary Examiner

J. J. McLAUGHLIN, JR., Assistant Examiner

U.S. Cl. X.R.

91—376; 137—627.5; 303—52, 56